3,152,790
IMMERSION VIBRATOR FOR COMPACTING
CONCRETE
Rudolf Meyer, 6 Grubenstrasse, Wettingen,
Aargau, Switzerland
Filed May 11, 1961, Ser. No. 129,915
3 Claims. (Cl. 259—1)

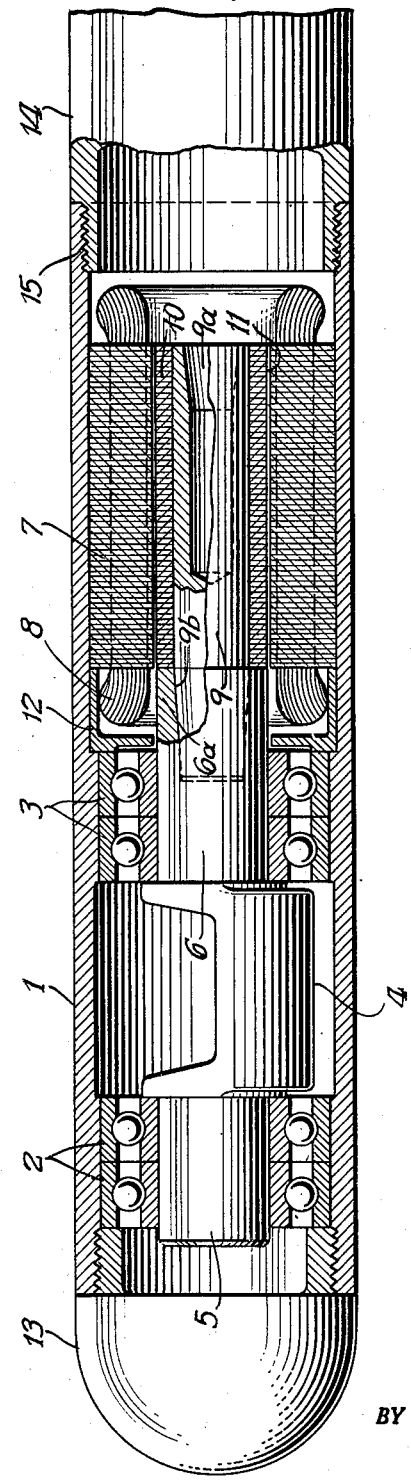

The present invention relates to a new and novel immersion vibrator for use in compacting concrete a particular feature of which is the incorporation of a self-contained drive mechanism and a further feature of which is the use of a dual bearing mount for the eccentric mass driven by said mechanism to produce the desired vibration.

In operating immersion vibrators which are designed with a single eccentrically rotating operating mass, extraordinarily high stresses are placed upon the bearings due to the centrifugal force and the radial pressure exerted at the speed at which they normally operate. As a consequence a rapid wear and tear on the ball bearings provided for the shaft is quite unavoidable. In the course of the normal maintenance of these immersion vibrators it has been found that the badly worn-down bearings must frequently be replaced by new ones. For such maintenance operations it is highly desirable that means be provided to enable this replacement of the worn bearings to be effected simply and rapidly. Such bearing replacement is somewhat complicated because of the usual coupling of the impulse motor with the eccentric mass especially since in the immersion vibrators heretofore employed a keyed connection was provided between the eccentric mass and the impulse motor which had to be first disassembled and then reassembled whenever a bearing replacement was made.

In accordance with the present invention, however, the necessity for such disassembly of a coupling between the eccentric mass and the rotor of the impulse motor is eliminated so that the bearings for the eccentric mass serve as the bearings for the drive motor as well.

An important object of this invention is to provide a vibrator comprising a rotatably mounted eccentric mass in which the shaft upon which the eccentric mass is mounted extends an appreciable distance beyond the bearings supporting the shaft thus enabling this extension to be used for mounting the rotor of the motor employed for driving the shaft and thus causing the eccentric mass to rotate.

A further object of this invention is to effect the mounting of the rotor or squirrel-cage armature of a multiphase induction motor upon the extension of the drive shaft whereby, when assembling and disassembling the vibrator, said rotor does not interfere with the ball-bearings provided.

Other objects and advantages will be apparent from the following detailed description and the accompanying drawing.

In the drawing, the figure is a longitudinal view in section of the immersion vibrator of this invention showing the several operating parts.

Referring now to the drawing, the immersion vibrator of this invention comprises an external, cylindrical steel housing 1 within which are seated a pair of ball bearings 2 and a second pair of ball bearings 3 which are suitably aligned and disposed as shown to serve as a mount for the lower end of shaft 5 and the upper end of shaft 6 which is designed to carry the eccentric, rotatably mounted mass 4. The motor which drives the shaft and eccentric mass integral therewith is a two- or three-phase squirrel-cage electric motor the elements of which are built into the housing and, as shown in the drawing, said motor comprises the stator core 7, windings 8 and the squirrel-cage armature 10 with the air gap of the motor being indicated by reference numeral 11. A partition 12 separates and seals off the chamber in which the stator is mounted from the chamber containing the bearings for the eccentric mass. The upper end of shaft 6 is extended to form a mandrel or arbor as shown in the drawing, the dimensions being such that it extends well beyond the upper pair of ball bearings 3. The shaft extension 6a carries the rotor 10 of the drive motor mounted thereon as brought out above.

In order to seal off the lower end of the structure when it is immersed and to avoid any leakage of water into the housing, the lower end of the assembly is provided with a rounded cap 13 which is threaded into the lower end of housing 1. At the opposite end of housing 1 are provided additional internal threads 15 into which is threaded a sealing nipple 14 which for convenience is also further provided with suitable terminals, not shown, for the power supply in the form of cable connections for use when the immersion vibrator is in operation. The squirrel-cage armature or rotor sections are frictionally mounted by a force fit on to an auxiliary section 9 for attachment to the shaft 6, the auxiliary section 9 being provided with a conical seat 9b by means of which it is force fitted on to the shaft extension 6a. The opposite end of the auxiliary section is hollowed out at 9a in order to minimize the weight.

By reason of the remote mounting of the rotor on the shaft extension important advantages are gained. The rotor, for example, need only be but a few tenths of a millimeter smaller in diameter than the inner dimension or bore of the ball-bearing sleeve so that in effecting the assembly of the parts the thus mounted rotor can pass readily through the bore of the ball-bearings employed. Because of this the assembly and the disassembly of the parts is quite simple. During replacement of the ball-bearing or during occasional inspection the stator of the motor remains in the external housing and the rotor is removed along with the removal of the eccentric mass.

The ball-bearings have the greatest possible diameter in view of the great mechanical stresses involved. Their relatively large internal diameter makes it possible to construct the rotor with a sufficiently large diameter. The optimum dimensions of the rotor with regard to the motor itself and as compared to the external diameter of the motor permit these to be designed to about the correct or ideal proportions. A further advantage of the present invention resides in the fact that the absence of separate motor bearings permits the device to be of minimum dimensions longitudinally. The ball-bearings are directly mounted in the shell of the housing without the use of intermediate parts or mounting elements. Accordingly, extremely high dimensional precision and accuracy can be achieved in setting the bearings into position. This permits the air gap 11 to be held to a dimension of between about 0.1 to 0.3 mm. which greatly increases the efficiency of the motor.

The absence of separate ball-bearings for the motor itself greatly decreases the bearing frictional losses. Because of the very high radial load on the ball-bearings this is a very substantial advantage and has a very advantageous effect upon the life of the machine, with a correspondingly beneficial influence upon the servicing schedule and thus greatly decreases the need for frequent inspection and the replacement of bearings.

As a power source for the immersion vibrator of this invention one can also employ a compressed air motor. In such case also the rotor may be separably mounted upon the extension of the drive shaft. Again, the diameter of the rotor need only be slightly smaller than the internal diameter of the ball-bearings thus permitting the space between the stator and rotor to be quite small with clearances of about 0.1 to 0.3 mm. being easily maintained.

I claim:

1. An immersion vibrator for compacting concrete comprising a sealed outer housing containing:
    self-contained drive means having a stator and a rotor, said stator being integral with said housing,
    a shaft having a weight eccentrically connected thereto,
    a bearing for said shaft on each side of said weight,
    said shaft having an extension extending beyond the bearing adjacent to said extension,
    said extension having a free end,
    said rotor being mounted on said free end of said extension and having a diameter of a dimension smaller than the internal diameter of the shaft bearings.

2. An immersion vibrator in accordance with claim 1 wherein said drive means comprises a multiphase induction motor in which the stator core and windings are integral with said housing and the squirrel-cage armature is the rotor on said free end.

3. An immersion vibrator in accordance with claim 2 wherein the squirrel-cage armature comprising the rotor is frictionally mounted on the end of said shaft extension by a force fit.

References Cited in the file of this patent

UNITED STATES PATENTS

| 2,059,239 | Jackson | Nov. 3, 1936 |
| 2,662,750 | Degen | Dec. 15, 1953 |
| 2,800,309 | Giertz-Hedstrom | July 23, 1957 |

FOREIGN PATENTS

| 767,356 | France | May 1, 1934 |